US00RE45159E

(19) United States
(12) Reissued Patent
Cippitani

(10) Patent Number: US RE45,159 E
(45) Date of Reissued Patent: Sep. 23, 2014

(54) SYSTEM FOR SUPPLY OF LPG/AMMONIA FOR DIRECT-INJECTION PETROL OR DIESEL ENGINES

(71) Applicant: Icomet SpA, Latina (IT)

(72) Inventor: Luciano Cippitani, Nettuno (IT)

(73) Assignee: Icomet SpA, Latina (IT)

(21) Appl. No.: 13/845,487

(22) Filed: Mar. 18, 2013

Related U.S. Patent Documents

Reissue of:
(64) Patent No.: 8,180,556
Issued: May 15, 2012
Appl. No.: 12/526,215
PCT Filed: Feb. 5, 2009
PCT No.: PCT/IT2009/000036
§ 371 (c)(1),
(2), (4) Date: Aug. 6, 2009
PCT Pub. No.: WO2009/098728
PCT Pub. Date: Aug. 13, 2009

(30) Foreign Application Priority Data

Feb. 6, 2008 (IT) ..... RM2008A0065

(51) Int. Cl.
*F02D 41/00* (2006.01)
*F02M 43/00* (2006.01)
*F02M 21/02* (2006.01)
*F02B 47/04* (2006.01)

(52) U.S. Cl.
USPC ..... 701/104; 123/1 A; 123/525; 123/526; 123/304

(58) Field of Classification Search
USPC ..... 701/101–105, 110–115; 123/1 A, 2, 3, 123/27 GE, 198 A, 299, 300, 304, 525, 123/526–533, 446, 447, 497, 575–578, 123/DIG. 7
See application file for complete search history.

(56) References Cited

U.S. PATENT DOCUMENTS

| | | | |
|---|---|---|---|
| 5,379,740 | A | 1/1995 | Moore et al. |
| 5,408,957 | A | 4/1995 | Crowley |
| 5,601,792 | A | 2/1997 | Hug et al. |
| 5,775,282 | A | 7/1998 | Smith |
| 6,035,837 | A | 3/2000 | Cohen et al. |
| 7,723,257 | B2 | 5/2010 | Bosteels |
| 2006/0042606 | A1 | 3/2006 | Van Dyke |
| 2006/0207243 | A1 | 9/2006 | Roberts et al. |

FOREIGN PATENT DOCUMENTS

| | | | |
|---|---|---|---|
| DE | 10 2004 011 414 | | 4/2005 |
| DE | 10 2004 011 414 | A1 | 4/2005 |
| EP | 1 043 488 | | 10/2000 |
| EP | 1 043 488 | A1 | 10/2000 |
| WO | 2004-097196 | | 11/2004 |
| WO | 2004/097196 | A1 | 11/2004 |

OTHER PUBLICATIONS

International Search Report dated Jul. 2, 2009, from corresponding PCT application.

*Primary Examiner* — John T. Kwon
*Assistant Examiner* — Johnny H Hoang
(74) *Attorney, Agent, or Firm* — Young & Thompson

(57) ABSTRACT

A system for supply of LPG/ammonia for direct-injection petrol or diesel engine includes an electronic control unit where the control unit governs a petrol/diesel pump, a supplementary petrol/diesel pump, a petrol/diesel-delivery solenoid vale, LPG/ammonia-return solenoid valve, LPG/ammonia pump, a supplementary LPG/ammonia pump, a LPG/ammonia-delivery solenoid vale and a LPG/ammonia injector, such that only one of LPG/ammonia and petrol/diesel is fed to the engine at any point in time, and a combination of i) LPG and petrol, ii) LPG and diesel, iii) ammonia and petrol, and iv) ammonia and diesel is never fed to the engine.

20 Claims, 3 Drawing Sheets

SYSTEM FOR SUPPLY OF LPG/AMMONIA FOR DIRECT-INJECTION PETROL OR DIESEL ENGINES

Matter enclosed in heavy brackets [ ] appears in the original patent but forms no part of this reissue specification; matter printed in italics indicates the additions made by reissue.

Manufacturers of petrol/diesel engines are currently increasingly oriented towards direct-injection supply governed by electronic control units, which present increasingly sophisticated strategies necessary both for optimizing supply of the engines, thus easily obtaining the best possible combustion and consequently also the lowest emissions of unburnt particles in the exhaust, and because the catalytic converters and probes with which they are provided could not function with engines the injection supply of which were not governed by an electronic control unit.

Recently, on account of the high price of petrol and diesel, the to continuously increasing rate of pollution in particular in large urban areas, and the resonance that environmental problems caused by pollution are raising, there is an increasingly frequent demand for automobiles, including brand new ones, to have the possibility of being fuelled not only by petrol/diesel also by LPG/ammonia.

The conversion to LPG/ammonia of these engines entails considerable difficulties in so far as it is impossible to reproduce the strategies of supply required thereby because they are equipped with particular injectors that moreover function at very high pressures.

Given the demand, some manufacturers of systems have converted direct-injection petrol engines to LPG in the gaseous phase, but to obtain their operation they are have had to resort to compromises, with consequent anomalies dictated by the different strategies of operation in so far as the engine functions with LPG only at a given r.p.m., whereas during idling or when the maximum power is required, the engine runs on petrol, thus rendering far from convenient conversion to LPG by customers.

The purpose of the present invention is a system that will enable conversion of direct-injection petrol/diesel engines to LPG/ammonia in the liquid phase, using the same electronic control unit and the same original system of the vehicle, eliminating the operating faults to which reference has been made.

The conversion to LPG/ammonia in the liquid phase as mentioned above entails in any case difficulties that arise both when travelling and during starting of the engine.

In particular, with operation using LPG/ammonia the difficulties of starting are frequent when the engine has been turned off after a period of operation with LPG/ammonia, since the high temperature of the engine causes gasification of the liquid present within the high-pressure pump, rendering subsequent starting very problematical, if not impossible.

According to the present invention, the LPG/ammonia supply of the engine is obtained using the same electronic control unit and the same original petrol/diesel fuelling system of the vehicle by inserting a purposely provided adapter on the high-pressure pump, which enables, when the engine is fuelled with LPG/ammonia, prevention of gasification through a purposely provided duct for return of the liquid in excess, and by closing, during operation with LPG/ammonia, inlet of the petrol/diesel to the high-pressure pump to which LPG/ammonia is sent in the liquid phase.

Closing of the passage of the petrol/diesel and opening of the passage for delivery and return of the LPG/ammonia in the liquid phase, and obviously vice versa, are performed by means of appropriate devices, which can be grouped together in the distribution assembly, governed with times and modalities purposely studied by a control unit for governing the switching strategies.

The control unit for governing the switching strategies moreover controls, in an automatic and programmed way, the devices that enable the drawbacks of operation and in particular, as has been said, the drawbacks that occur during switching of operation from petrol/diesel to LPG/ammonia during starting of the engine with LPG/ammonia and during switching of operation from LPG/ammonia to petrol/diesel to be overcome, whereas for application on diesel engines the control unit manages, via an appropriate wiring, also the opening signal to be sent to the injectors with a pre-set delay so as to guarantee that combustion, given the diversity of fuels, does not occur in advance.

The invention will now be described in a non-limiting embodiment, provided with reference to the attached drawings, in which.

Figure 1:
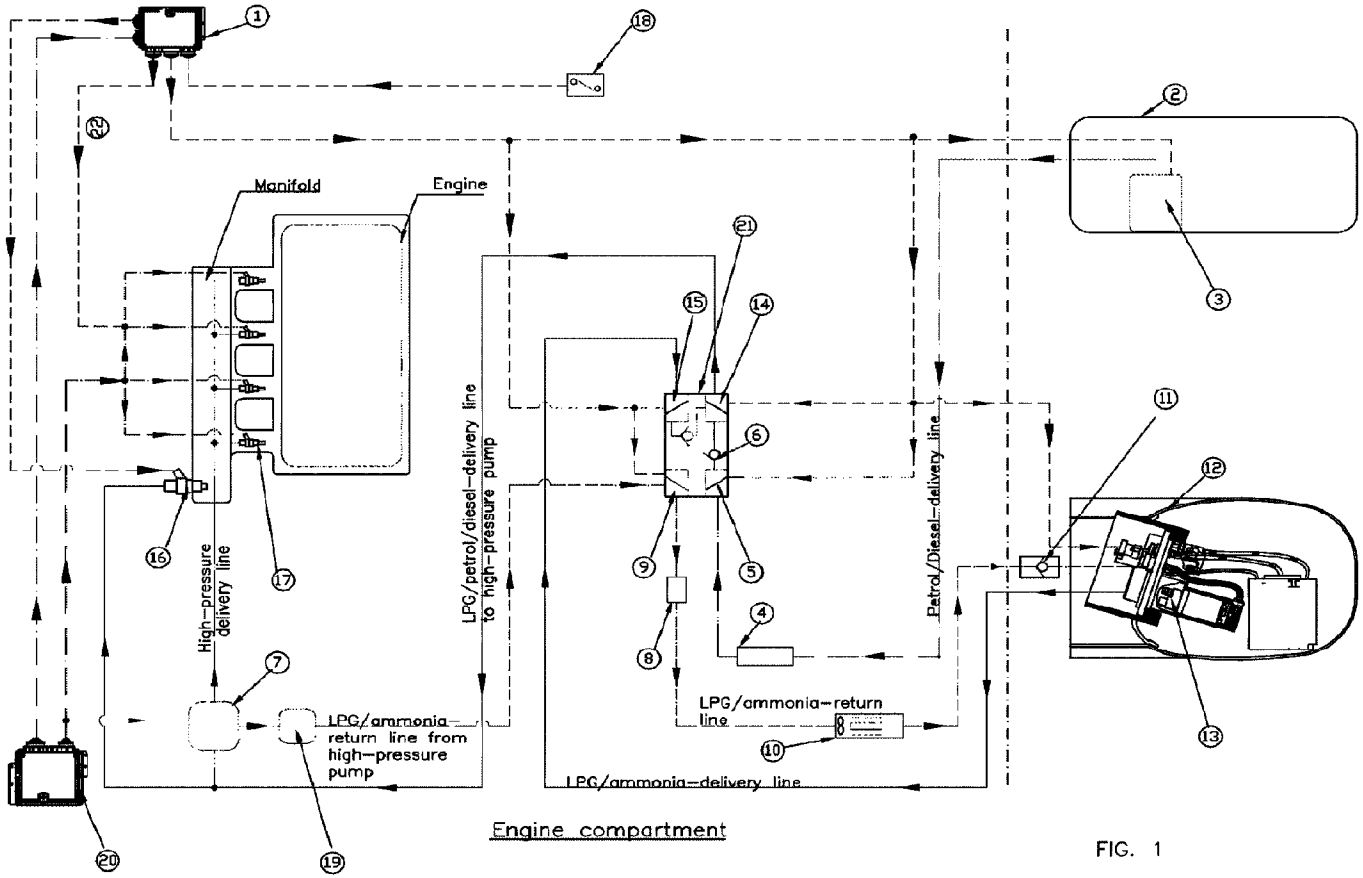
FIG. 1 shows a view of the high-pressure LPG/liquid-ammonia system.
Figure 2:
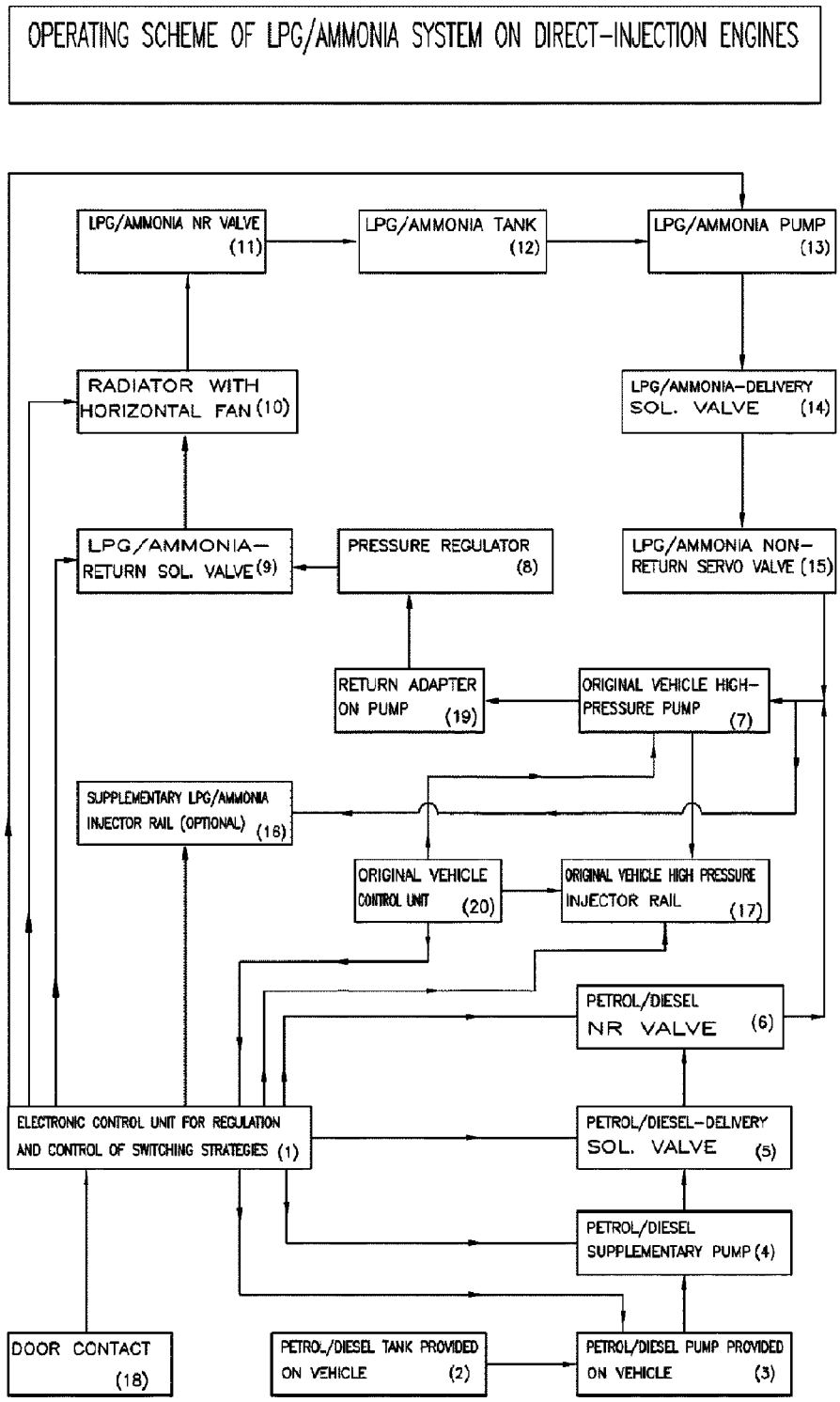
FIG. 2 shows a block diagram of operation of the LPG/ammonia to system on direct-injection engines.

According to said diagrams exemplifying the system, this is schematically made up of:

- an electronic control unit for regulation and control of the switching strategies (1);
- a petrol/diesel tank provided on the vehicle (2);
- a petrol/diesel pump provided on the vehicle (3);
- one or more supplementary petrol/diesel pumps (4);
- a petrol/diesel-delivery solenoid valve (5);
- a petrol/diesel non-return valve (6);
- an original high-pressure pump of the vehicle (7);
- an LPG/ammonia pressure regulator (8);
- an LPG/ammonia-return valve (9);
- an additional radiator with cooling fan (10);
- an LPG/ammonia non-return valve (11);
- an LPG/ammonia tank (12);
- an LPG/ammonia pump (13);
- a LPG/ammonia-delivery solenoid valve (14);
- an LPG/ammonia non-return valve (15);
- a supplementary LPG/ammonia injector (16);
- original high-pressure injector rail (17) of the vehicle;
- a door contact on the driver side (18);
- a device on the high-pressure pump to enable return of the fuel in excess to the tank during operation with LPG/ammonia (19);
- an original electronic control unit (20) of the vehicle;
- a distribution assembly with solenoid valves (21), in which the devices for closing the passage of the petrol/diesel and opening the passage for delivery and return of the LPG/ammonia in the liquid phase, and vice versa, are grouped together;
- a valve for discharge of the LPG/ammonia overpressure (26);
- an LPG/ammonia supplementary pump (27); and
- non-return valves (24), (25), (28);

According to the present invention, the original electronic control unit (20) of the vehicle manages, during operation of the engine, in the same way strategies of carburation of both the petrol and the LPG/ammonia, governing the rail of the injectors (17) indistinctly and in the same way according to the type of fuel selected, whereas, for operation of the diesel engine, the electronic control unit for regulation and control of the switching strategies (1) manages, via the wiring (22), also the opening signal to be sent to the injectors with a pre-set delay so as to guarantee that the combustion, given the diversity of the fuels, does not occur in advance; it moreover activates one or more of the devices listed according to modalities of use and the operations requested by the driver.

In particular:

1) When switching of the supply from petrol/diesel to LPG/ammonia, the electronic control unit for regulation and control of the strategies (1) sends an enabling signal to the supply of the LPG/ammonia pump (13) and to the LPG/ammonia-delivery solenoid valve (14) and, after a predetermined period of time, for example 2 seconds, deactivates the petrol/diesel pump (3), and supplies the LPG/ammonia-return solenoid valve (9).
2) During starting of the engine that had previously been functioning with LPG/ammonia supply, upon switching-on of the dashboard the control unit (1) supplies the petrol-delivery solenoid valve (5) and, after a certain period of time, for example 1 second, for a predetermined period of time, for example 5 seconds, the petrol/diesel pump (3), the supplementary petrol/diesel pump (4), and the LPG/ammonia-return solenoid valve (9) are automatically activated; in this way, the gasified liquid is eliminated from the circuit and in particular from the high-pressure pump (7). Once the set time, for example 5 seconds, has elapsed the control unit (1) deactivates the supplementary petrol/diesel pump (4) and the LPG/ammonia-return solenoid valve (9), keeping instead active for a further period of time, for example 15 seconds, the petrol/diesel-delivery solenoid valve (5) and the petrol/diesel pump (3), ensuring operation of the engine with petrol/diesel. Upon expiration of the predetermined time, the petrol/diesel-delivery solenoid valve (5) and the pump (3) are deactivated, whereas the LPG/ammonia pump (13), the LPG/ammonia-delivery solenoid valve (14), and the LPG/ammonia-return solenoid valve (9) are activated. The pulse to the control unit (1), to carry out the procedure described, may also be imparted by the command from a contact (18) activated by the opening of the door on the driver side, with the engine turned off.
3) During switching-off of the engine operating with LPG/ammonia, the control unit (1) supplies for a predetermined period of time, for example 6 seconds, the petrol/diesel-delivery solenoid valve (5), and, after 1 second, the petrol/diesel pump (3), the supplementary petrol/diesel pump (4), and the LPG/ammonia-return solenoid valve (9) are supplied for 5 seconds. Upon elapse of the 6 seconds, the petrol/diesel-delivery solenoid valve (5), the petrol/diesel pump (3), and the supplementary petrol/diesel pump (4) are deactivated, whereas the LPG/ammonia-return solenoid valve (9) remains open for 120 seconds, to enable elimination of the LPG imprisoned in the circuit of the high-pressure pump (7), preventing any rise of the pressure of the LPG due to the heat and its gasification, thus preparing the engine for petrol-fuelled starting.
4) During switching of operation from LPG/ammonia to petrol/diesel, the control unit (1) activates the petrol/diesel-delivery solenoid valve (5) and, after 1 second, activates the petrol/diesel pump (3) and the supplementary petrol/diesel pump (4); it deactivates the LPG/ammonia pump (13) and the LPG/ammonia-delivery solenoid valve (14), whilst to the LPG/ammonia-return solenoid valve (9) is kept active for 5 seconds, and, once this period has elapsed, is deactivated simultaneously with the supplementary petrol/diesel pump (4)

The procedures described, of which the pulses of activation and deactivation and the successions of the steps and the timing are governed by the control unit (1) for regulation and control of the switching strategies, enable operation of the engine with LPG/ammonia and passage of supply from LPG/ammonia to petrol/diesel, and vice versa, optimizing operation and, in particular starting in any climatic condition.

There should in any case be highlighted the considerable importance of the supplementary petrol/diesel pump (4), which, working simultaneously with the petrol/diesel pump (3) of the vehicle, enables rise of the pressure of the petrol/diesel and free from the LPG/ammonia the high-pressure pump (7) and the circuit in general, thus preventing its gasification and enabling starting of the engine in any climatic condition.

To make up for the diversity of the two fuels and solve the problem of lean carburation due to the difference of the specific weight of the fuels, the control unit (1) for regulation and control of the switching strategies automatically manages the LPG/ammonia supplementary injector (16) so as to deliver the amount of fuel that is lacking according to the r.p.m. and the demand of the engine for proper carburation.

The same result of delivering the amount of fuel that is lacking according to the r.p.m. and the demand of the engine for proper carburation is obtained by managing with the control unit (1) for regulation and control of the switching strategies the signal of the fuel high-pressure sensor (23) so as to regulate the right amount of fuel to the engine.

In the same way, to make up for the difference between the two fuels and solve the problem of lean carburation due to the difference of the specific weight of the fuels, the control unit (1) for regulation and control of the switching strategies automatically manages the supply voltage to the LPG/ammonia pump (13), consequently varying the power of the pump to and the pressure of the LPG/ammonia so as to deliver the amount of fuel that is lacking according to the r.p.m. and the demand of the engine for proper carburation.

In order to increase the reliability of the system during operation with LPG at high external temperatures, there is envisaged installation of a radiator equipped with an electric fan connected to the control unit (1) through an outlet activated by the control unit (1) itself when the engine turns at a rate of less than or equal to 1 000 r.p.m. The supplementary radiator cools the LPG, thus preventing any increase of the pressure in the tank (12), as well as preventing any problems of overpressure in the supply circuit and the drawbacks in supply on account of the high pressure in the tank itself.

To obtain return of the LPG/ammonia in excess to the tank and guarantee circulation thereof, as has already been said, associated to the high-pressure pump (7) is the adapter device (19), which prevents gasification and ensures proper carburation of the engine.

Figure 3:
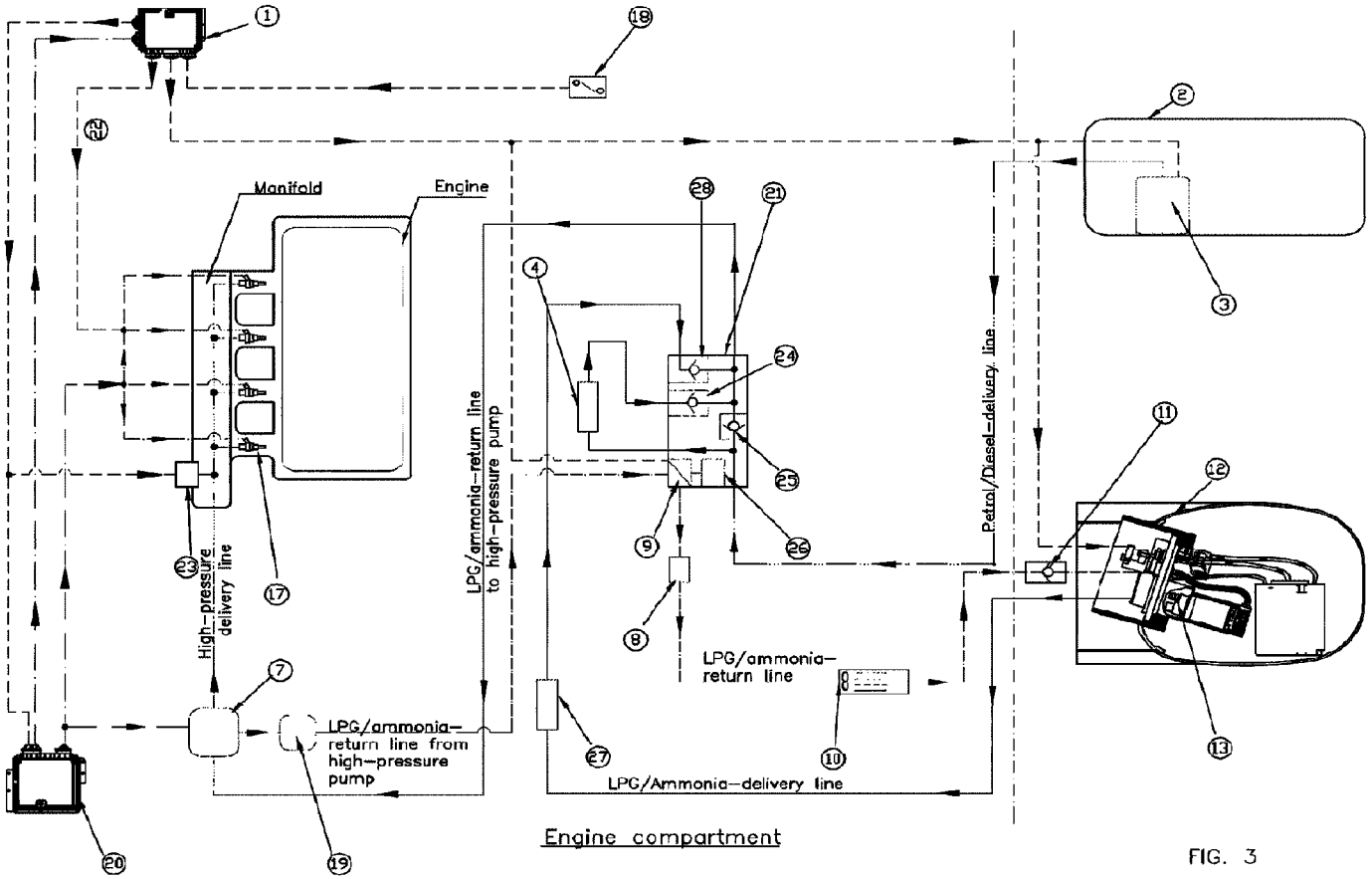
FIG. 3 shows a variant of the high-pressure LPG/liquid-ammonia system.

In a variant of the invention (illustrated in FIG. 3), there is provided a further supplementary LPG/ammonia pump (27) on the LPG/ammonia supply line, designed to eliminate from the LPG/ammonia supply circuit the possible presence of gasified LPG/ammonia in order to enable starting of the engine previously functioning with LPG/ammonia supply directly with LPG/ammonia, without the need to start it with petrol/diesel, as indicated to the preceding point 2.

Advantageously, in this variant of the invention, operation according to the preceding point 3, regarding switching-off of the engine functioning with LPG/ammonia supply, is no longer necessary.

In this regard, it should be noted that, in the variant of the invention being described, equipped with supplementary LPG/ammonia pump (27), during starting of the engine previously functioning with LPG/ammonia supply, upon switching-on of the dashboard the control unit (1) activates the supplementary LPG/ammonia pump (27) and the LPG/ammonia pump (13), and the LPG/ammonia-delivery solenoid valve (14) and the LPG/ammonia-return solenoid valve (9).

The pulse to the control unit (1), in order to carry out the procedure described, can also be imparted—instead of by switching-on of the dashboard—by the command from a contact (18) activated by opening of the door on the driver side, with the engine turned off. In the latter case, if the engine is not turned on within a given time, it is envisaged that switching-on of the dashboard replicates the operation corresponding to activation of the aforesaid LPG/ammonia pumps.

LIST OF THE MAIN COMPONENTS

1 Electronic control unit for regulation and control of switching strategies
2 Petrol/diesel tank
3 Petrol/diesel pump
4 Supplementary petrol/diesel pump
5 Petrol/diesel-delivery solenoid valve
6 Petrol/diesel non-return valve
7 High-pressure pump
8 Pressure regulator
9 LPG/ammonia-return solenoid valve
10 Radiator with fan
11 Non-return valve
12 LPG/ammonia tank
13 LPG/ammonia pump
14 LPG/ammonia-delivery solenoid valve
15 LPG/ammonia non-return servo valve
16 Supplementary injector
17 Petrol/LPG/diesel/ammonia injector rail
18 Door-contact device
19 Return device
20 Original vehicle control unit
21 Distribution assembly with solenoid valves
22 Wiring present for application on diesel engine
23 High-pressure sensor
24 Petrol/diesel non-return valve to supplementary pump
25 Petrol/diesel non-return valve
26 LPG/ammonia-overpressure discharge valve
27 Supplementary LPG/ammonia pump
28 LPG/ammonia non-return valve

The invention claimed is:

1. A system for [supply of] *supplying* LPG/ammonia for direct-injection petrol or diesel engines[,] *of vehicles comprising a petrol/diesel tank* (*2*)*, a petrol/diesel pump* (*3*)*, an original high-pressure pump* (*7*)*, an original high-pressure injector rail* (*17*) *and an original electronic control unit* (*20*)*; said system* comprising:

an electronic control unit for regulation and control of switching strategies (1);
[a petrol/diesel tank provided on the vehicle (2);
a petrol/diesel pump provided on the vehicle (3);]
one or more supplementary petrol/diesel pumps (4);
a petrol/diesel-delivery solenoid valve (5);
a petrol/diesel non-return valve (6);
[an original high-pressure pump of the vehicle (7);]
an LPG/ammonia pressure regulator (8);
an LPG/ammonia-return valve (9);
an additional radiator with cooling fan (10);
an LPG/ammonia non-return valve (11);
an LPG/ammonia tank (12);
an LPG/ammonia pump (13);
an LPG/ammonia-delivery solenoid valve (14);
an LPG/ammonia non-return valve (15);
[a supplementary LPG/ammonia injector (16);
an original high-pressure injector rail (17) of] *means* (*16; 23*) *for controlling delivery of the amount of fuel that is lacking according to the r.p.m. and* the [vehicle] *demand of the engine for proper carburetion*;
an adapter (19) connected to the high-pressure pump (7), which adapter (19) enables circulation and return of the LPG/ammonia to the tank;
[an original electronic control unit (20) of the vehicle;] and
a distribution assembly with solenoid valves (21), which combines the devices for opening the passage for delivery and return of the LPG/ammonia in the liquid phase;

in which with modalities, succession, and times pre-set according to:

the mode of operation of the engine with LPG/ammonia or petrol/diesel,
switching of operation of the engine with LPG/ammonia fuelling or petrol/diesel fuelling,
arrest of the engine, and
the modalities requested by the driver, the control unit (1) governs the petrol/diesel pump (3), the supplementary petrol/diesel pump (4), the petrol/diesel-delivery solenoid valve (5), the LPG/ammonia-return solenoid valve (9), the LPG/ammonia pump (13), the supplementary LPG/ammonia pump (27), [the LPG/ammonia-delivery solenoid valve (14), and the LPG/ammonia injector (16), wherein, only one of LPG/ammonia and petrol/diesel is fed to the engine at any point in time, and
a combination of i) LPG and petrol, ii) LPG and diesel, iii) ammonia and petrol, and iv) ammonia and diesel is never fed to the engine] *and the LPG/ammonia-delivery solenoid valve* (*14*).

2. The system for [supply of] *supplying* LPG/ammonia for direct-injection petrol or diesel engines according to claim 1, characterized in that the supplementary petrol/diesel pump (4) operating in combination with the petrol/diesel pump (3) provided on the vehicle increases the pressure of the petrol/diesel fuel forcing the outflow of the gas present in the high-pressure pump (7) and preparing the system for the subsequent starting.

3. The system for [supply of] *supplying* LPG/ammonia for direct-injection petrol or diesel engines according to claim 1, characterized in that the control unit (1) for regulation and control of the switching strategies, during switching of the supply from petrol/diesel to LPG/ammonia, sends an enabling signal to the supply of the LPG/ammonia pump (13) and to the LPG/ammonia-delivery solenoid valve (14), and after a predetermined period of time, deactivates the petrol/diesel pump (3) and supplies the LPG/ammonia-return solenoid valve (9).

4. The system for [supply of] *supplying* LPG/ammonia for direct-injection petrol or diesel engines according to claim 1, characterized in that the control unit (1) for regulation and control of the switching strategies, during starting of the engine with LPG/ammonia fuelling, supplies the petrol-delivery solenoid valve (5), and, after a certain period of time, the petrol/diesel pump (3), the supplementary petrol/diesel pump (4), and the LPG/ammonia-return solenoid valve (9) are automatically activated for a predetermined period of time; in this way, the gasified liquid is eliminated from the circuit and in particular from the high-pressure pump (7); once the set time, has elapsed the control unit (1) deactivates the supplementary petrol/diesel pump (4) and the LPG/ammonia-return solenoid valve (9), keeping, instead, active for a further period of time, the petrol/diesel-delivery solenoid valve (5) and the petrol/diesel pump (3), ensuring operation of the engine with petrol/diesel fuelling; upon expiration of the predetermined time the petrol/diesel-delivery solenoid valve (5) and the pump (3) are deactivated, whilst the LPG/ammonia pump (13), the LPG/ammonia-delivery solenoid valve (14), and the LPG/ammonia-return solenoid valve (9) are activated.

5. The system for [supply of] *supplying* LPG/ammonia for direct-injection petrol or diesel engines according to claim 1, characterized in that the control unit (1) for regulation and control of the switching strategies, during switching-off of the engine with LPG/ammonia fuelling, supplies for a predetermined period of time, the petrol-delivery solenoid valve (5), and, after 1 second, the petrol/diesel pump (3), the supplementary petrol pump (4), and the LPG-return solenoid valve (9) are supplied for 5 seconds; upon elapse of the 6 seconds, the petrol-delivery solenoid valve (5), the petrol pump (3) and the supplementary petrol pump (4) are deactivated, whilst the LPG-return solenoid valve (9) remains open for 120 seconds to enable outflow of the LPG imprisoned in the circuit of the high-pressure pump, thus preventing, on account of the heat of the engine, any rise of the pressure and its gasification, preparing the engine for petrol/diesel-fuelled starting.

6. The system for [supply of] *supplying* LPG/ammonia for direct-injection petrol or diesel engines according to claim 1, characterized in that the control unit (1) for regulation and control of the switching strategies, during switching of operation from LPG/ammonia to petrol/diesel, activates the petrol-delivery solenoid valve (5) and, after 1 second, activates the supplementary petrol pump (4); it deactivates the LPG pump (13) and the LPG-delivery solenoid valve (14), whilst the LPG-return solenoid valve (9) is kept active for 2 seconds, after which it is deactivated simultaneously with the supplementary petrol/diesel pump (4).

[7. The system for supply of LPG/ammonia for direct-injection petrol or diesel engines according to claim 1, characterized in that, to make up for differences between fuels and solve lean carburation due to differences of the specific weight of fuels, the control unit (1) for regulation and control of the switching strategies automatically manages the supplementary injector (16) of the LPG/ammonia so as to deliver the amount of fuel that is lacking according to the r.p.m, and the demand of the engine for proper carburation.]

[8. The system for supply of LPG/ammonia for direct-injection petrol or diesel engines according to claim 1, characterized in that, to make up for differences between fuels and solve lean carburation due to differences of the specific weight of fuels, the control unit (1) for regulation and control of the switching strategies automatically manages the current of the LPG/ammonia pump (13) by varying the voltage and consequently the power of the pump so as to supply the pressure suitable for delivery of the amount of fuel necessary according to the r.p.m, and the demand of the engine for proper carburation.]

9. The system for [supply of] *supplying* LPG/ammonia for direct-injection petrol or diesel engines according to claim 1, characterized in that connected to the high-pressure pump (7) is the adapter device (19), which enables circulation and return of the liquid in excess during operation with LPG/ammonia preventing gasification thereof and ensuring optimal carburation.

10. The system for [supply of] *supplying* LPG/ammonia for direct-injection petrol or diesel engines according to claim 5, characterized in that the pulse to the control unit (1) for carrying out the procedure during switching-off of the engine with LPG/ammonia-fuelled operation is issued by the command for arrest of the engine.

11. The system for [supply of] *supplying* LPG/ammonia for direct-injection petrol or diesel engines according to claim 4, characterized in that the pulse to the control unit (1) for carrying out the procedure during starting of the engine with LPG/ammonia-fuelled operation is issued by a purposely provided contact (18), which signals opening of the door on the driver side with the engine turned off, instead of by switching-on of the dashboard.

12. The system for [supply of] *supplying* LPG/ammonia for direct-injection petrol or diesel engines according to claim 1, characterized in that there is envisaged installation of a radiator equipped with an electric fan connected to the control unit (1) through an output activated by the control unit (1) itself when the engine turns at a rate of less than or equal to 1000 r.p.m.; the supplementary radiator has the function of cooling the LPG, thus preventing increase of the pressure in the tank (12), preventing the problems of overpressure in the supply circuit and the drawbacks in supply on account of the high pressure in the tank itself.

13. The system for [supply of] *supplying* LPG/ammonia for direct-injection petrol or diesel engines according to claim 1, characterized in that the original electronic control unit (20) of the vehicle manages, during operation, in the same way the strategies of carburation of both the petrol/diesel and the LPG/ammonia, governing the rail of the injectors (17) indistinctly and in the same way according to the type of fuel selected.

14. The system for [supply of] *supplying* LPG/ammonia for direct-injection petrol or diesel engines according to claim 1, characterized in that the control unit (1) for regulation and control of the switching strategies on diesel engines manages via a wiring (22) also the opening signal to be sent to the injectors with a pre-set delay so as to guarantee that the combustion, given the diversity of the fuels, does not occur in advance.

15. The system for [supply of] *supplying* LPG/ammonia for direct-injection petrol or diesel engines according to claim 1, characterized in that the devices for distribution of the corresponding fuels are inserted in a single distribution assembly (21).

16. The system for [supply of] *supplying* LPG/ammonia for direct-injection petrol or diesel engines according to claim 1, characterized in that it further comprises a supplementary LPG/ammonia pump (27) on the LPG/ammonia supply line.

17. The system for [supply of] *supplying* LPG/ammonia for direct-injection petrol or diesel engines according to claim 16, characterized in that, during starting of the engine with LPG/ammonia fuelling, the control unit (1) for regulation and control of the switching strategies activates, for a given time, the supplementary LPG/ammonia pump (27) and the LPG/ammonia pump (13), and the LPG/ammonia-delivery solenoid valve (14) and the LPG/ammonia-return solenoid valve (9).

18. The system for [supply of] *supplying* LPG/ammonia for direct-injection petrol or diesel engines according to claim 16, characterized in that, in the case where the control unit (1) for regulation and control of the switching strategies is set for fuelling the engine with LPG/ammonia, a purposely provided contact (18) signals opening of the door on the driver side with the engine turned off to the control unit (1), which, appropriately programmed, activates immediately the supplementary LPG/ammonia pump (27), the LPG/ammonia pump (13), the LPG/ammonia-delivery solenoid valve (14), and the LPG/ammonia-return solenoid valve (9), for a programmed time; and in that, after said programmed time, said operation is performed by switching-on of the dashboard.

19. The system for [supply of] *supplying* LPG/ammonia for direct-injection petrol or diesel engines according to claim 1, characterized in that it further comprises a valve for discharge of the LPG/ammonia overpressure (26).

20. The system for [supply of] *supplying* LPG/ammonia for direct-injection petrol or diesel engines according to claim 1, characterized in that said distribution assembly (21) further comprises non-return valves (24, 25, 28).

*21. The system for supplying LPG/ammonia for direct-injection petrol or diesel engines according to claim 1, characterized in that said means for controlling delivery of the amount of fuel that is lacking according to the r.p.m. and the demand of the engine for proper carburation comprise a supplementary LPG/ammonia injector (16) that is automatically managed by the control unit for regulation and control of the strategies (1).*

*22. The system for supplying LPG/ammonia for direct-injection petrol or diesel engines according to claim 1, characterized in that said means for controlling delivery of the amount of fuel that is lacking according to the r.p.m. and the demand of the engine for proper carburation comprise a fuel high-pressure sensor (23) whose signal is managed by the control unit for regulation and control of the strategies (1).*

* * * * *